Patented Feb. 22, 1927.

1,618,209

UNITED STATES PATENT OFFICE.

EDWIN R. LITTMANN, OF TERRE HAUTE, INDIANA, ASSIGNOR TO COMMERCIAL SOLVENTS CORPORATION, OF TERRE HAUTE, INDIANA, A CORPORATION OF MARYLAND.

SYNTHETIC RESIN AND ITS MANUFACTURE.

No Drawing.    Application filed November 25, 1925. Serial No. 71,463.

My invention resides in a process for producing heavy metal salts of half esters of nitrophthalic acid and in the compounds themselves, which are valuable for use as resins or gums in the arts.

Nitrophthalic acid is a dibasic organic acid having two carboxyl groups and a nitro group affixed to a benzene nucleus. It exists in two structually different forms which are commonly described as "3-nitrophthalic acid" and "4-nitrophthalic acid". These compounds are, respectively, 1, 2-dicarboxy-3 nitrobenzene, and 1, 2-dicarboxy-4 nitrobenzene, the numbers referring to the positions of the various groups on the benzene nucleus.

Half esters of nitrophthalic acid may be prepared by reacting one molecular weight of an aliphatic or aromatic alcohol with a molecular weight of nitrophthalic acid, whereby the alcoholic radicle, R, is attached to one carboxyl group of nitrophthalic acid, with the elimination of a molecule of water; the other carboxyl group of the nitrophthalic acid remaining in its original acid state. This reaction is indicated below in the case of 3-nitrophthalic acid:—

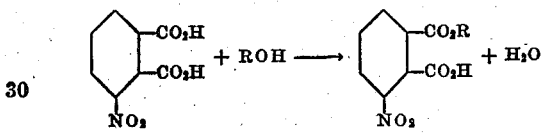

The reaction indicated above is an ordinary esterification in which the acid and alcohol are heated together in the presence of a catalyst such as a mineral acid. In the case of the reaction of free nitrophthalic acid with an alcohol (R) group the alcohol radicle attaches itself to the carboxyl group most removed from the nitro group, and this ester may be described as the "beta ester".

If the half ester is prepared by reacting an alcohol and 3-nitrophthalic anhydride, in which case no catalyst is necessary, the product obtained is the "alpha ester"—i. e.— an ester in which the alcohol radicle, R, attaches itself to the carboxyl group nearest to the nitro group as indicated below:—

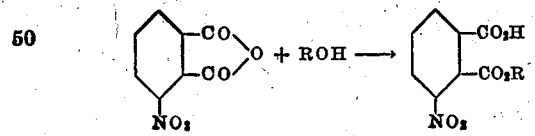

4-nitrophthalic acid may be esterified to produce either alpha or beta esters analogous to those above described.

My invention relates to certain novel compounds comprising heavy metal salts of half esters of nitrophthalic acid, and to the method of manufacture of these compounds. By "heavy metal" I mean a metallic element other than those of the alkali and alkaline earth groups.

Briefly, the method of preparing these substances comprises the following steps. A half ester of nitrophthalic acid, which may consist of an alpha or beta ester of 3 or 4 nitrophthalic acid, or a mixture of such esters of such acids, is treated with an aqueous solution containing sufficient sodium or potassium hydroxide to neutralize the free acid of the carboxyl group and to produce a salt of the half ester of nitrophthalic acid as is indicated below—

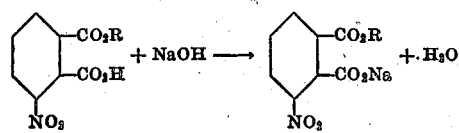

This material is soluble in water and is thus retained in the solution. Now, if there is added to this solution a solution of a heavy metal salt, a reaction occurs in which a heavy metal salt of a half ester of nitrophthalic acid is formed. With but one or two exceptions, heavy metals are polyvalent and the salt thus formed is a very complex molecule containing at least two nitrophthalic groups. For example we illustrate below the reaction in aqueous solution between the sodium salt of the beta half ester of 3-nitrophthalic acid and copper sulfate:—

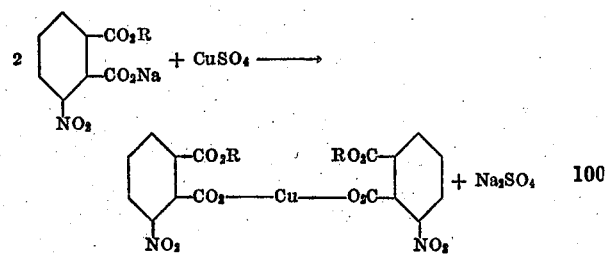

In the case of trivalent metals, an even more complex molecule results, as is indicated below in the reaction in aqueous solution between the potassium salt of the alpha half ester of 4-nitrophthalic acid and ferric chloride:—

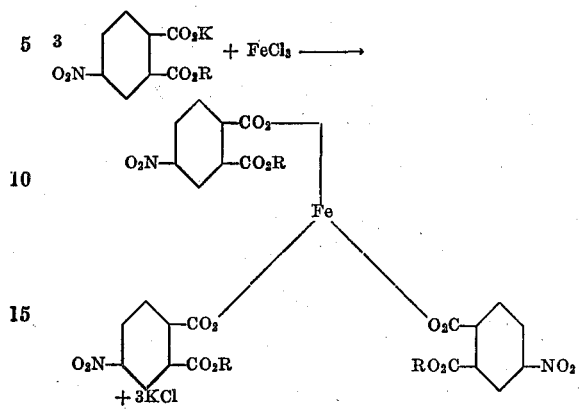

The novel compounds just described, which may be called heavy metal salts of half esters of nitrophthalic acid, are in general solid materials insoluble in water and soluble in ordinary organic solvents such as alcohols, ketones, esters, aldehydes, hydrocarbons, etc.

These compounds are resin-like in appearance and properties and may serve as satisfactory substitutes for natural gums and resins in the arts. The color of these compounds is controlled by the specific heavy metal which they contain. For example, the zinc, tin, and lead compounds are colorless, whereas nickel, chromium, and copper produce greenish blue compounds, and iron, cobalt, and manganese, produce reddish compounds. While my invention includes the production in general of heavy metal salts of half esters of 3-nitrophthalic acid or 4-nitrophthalic acid in which the ester group may represent an aliphatic alcohol such as ethyl, propyl, butyl, or amyl alcohol, or an aromatic alcohol such as benzyl or cinnamyl alcohol, I prefer to employ normal butyl alcohol in the production of these new compounds.

The normal butyl half esters of nitrophthalic acid may be obtained in good yield and the heavy metal salts of such compounds are stable materials easily soluble in almost any organic solvent, but insoluble in water.

Now, having generally described my invention, I shall give as a specific example, the production of the copper salt of the alpha-positioned normal butyl half ester of 3-nitrophthalic acid. One gram molecular weight of 3-nitrophthalic anhydride is refluxed with 1.2 gram molecules of normal butanol, whereupon the alpha-positioned monobutyl ester of 3-nitrophthalic acid is precipitated on cooling as a solid mass. After this material has been purified by crystallization from water, it is dissolved in 5 volumes of water containing one gram molecular weight of sodium hydroxide, whereupon the sodium salt of the alpha-positioned monobutyl ester of 3-nitrophthalic acid is formed. This material remains in the aqueous solution. A saturated aqueous solution containing one half of a gram molecular weight of copper sulfate is then added, whereupon the copper salt of the alpha-positioned monobutyl ester of 3-nitrophthalic acid is precipitated as a blue mass. After washing with water, this material is dried, whereupon it is obtained in pure form and will be found to be soluble in all common organic solvents such as acetone, butanol, benzol, toluol, butyl acetate, dibutyl phthalate, diacetone alcohol, etc.

While the above example is specific in nature, it should be understood that others of these novel compounds may be prepared in a like manner. For example, other heavy metals may be employed to produce other compounds of like structure. Instead of 3-nitrophthalic acid, 4-nitrophthalic acid may be employed. If desired the beta-positioned half esters of nitrophthalic acid may be used. Any alcohol, aliphatic or aromatic may be employed to produce the half ester.

Compounds of complex nature may be prepared by employing mixtures of different half esters of nitrophthalic acid in reactance with the same metallic salt. For example a resinous material may be prepared by reacting one molecule of the sodium salt of the alpha-positioned butyl half ester of 3-nitrophthalic acid and one molecule of the sodium salt of the beta positioned benzyl half ester of 4-nitrophthalic acid with a bivalent heavy metal salt. Such a reaction and compound is illustrated below, where R' is the butyl group and R'' is the benzyl group:—

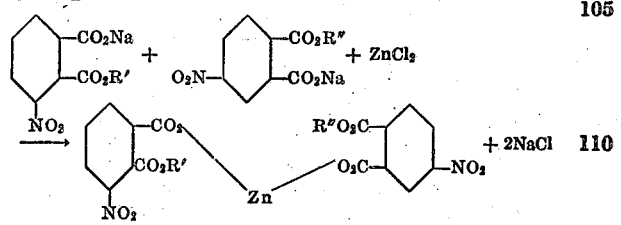

Now, having fully described my invention, I claim the following as new and novel:—

1. As a new composition of matter, a heavy metal salt of a half ester of nitrophthalic acid.

2. As a composition of matter, a polyvalent heavy metal salt of a half ester of nitrophthalic acid.

3. As a composition of matter, a polyvalent heavy metal salt in which the valences of the metal are satisfied by different half esters of nitrophthalic acid.

4. As a composition of matter, a polyvalent heavy metal salt in which the valences of the metal are satisfied by different half esters of nitrophthalic acid, at least one of which half ester groups is a normal butyl group.

5. As a composition of matter, a polyvalent heavy metal salt in which at least one of the valences of the metal is satisfied by a half ester of 3-nitrophthalic acid, the other valence being satisfied by a half ester of 4-nitrophthalic acid.

6. As a new composition of matter, a polyvalent heavy metal salt of a half ester of 3-nitrophthalic acid.

7. As a new composition of matter, a polyvalent heavy metal salt of an alpha-positioned half ester of nitrophthalic acid.

8. As a new composition of matter, a polyvalent heavy metal salt of the butyl half ester of nitrophthalic acid.

9. As a new composition of matter, a polyvalent heavy metal salt of the butyl ester of 3-nitrophthalic acid.

10. As a new composition of matter, a polyvalent heavy metal salt of the alpha-positioned butyl half ester of 3-nitrophthalic acid.

11. As a new composition of matter, the copper salt of the butyl half ester of nitrophthalic acid.

12. A process for the production of a polyvalent heavy metal salt of a half ester of nitrophthalic acid which consists in reacting an aqueous solution of a poylvalent heavy metal salt with an aqueous solution of an alkali metal salt of a half ester of nitrophthalic acid, and recovering the precipitated mass.

In testimony whereof I affix my signature.

EDWIN R. LITTMANN.